(12) United States Patent
Strasbaugh (10) Patent No.: US 6,696,005 B2
(45) Date of Patent: Feb. 24, 2004

(54) METHOD FOR MAKING A POLISHING PAD WITH BUILT-IN OPTICAL SENSOR

(75) Inventor: Alan Strasbaugh, San Luis Obispo, CA (US)

(73) Assignee: Strasbaugh, San Luis Obispo, CA (US)

(*) Notice: Subject to any disclaimer, the term of this patent is extended or adjusted under 35 U.S.C. 154(b) by 81 days.

(21) Appl. No.: 10/145,332

(22) Filed: May 13, 2002

(65) Prior Publication Data

US 2003/0209830 A1 Nov. 13, 2003

(51) Int. Cl.⁷ .......................... B29C 45/14; B29C 70/70
(52) U.S. Cl. .............. 264/263; 264/271.1; 264/272.11; 264/272.13; 264/275
(58) Field of Search ................ 451/6, 8, 9, 10, 451/41, 285, 286, 287, 288, 289, 290, 397, 398; 264/263, 271.1, 272.11, 272.13, 272.14, 272.15, 272.16, 272.17, 272.18, 275, 278

(56) References Cited

U.S. PATENT DOCUMENTS

| | | | |
|---|---|---|---|
| 5,081,796 A | | 1/1992 | Schultz .................. 51/165.74 |
| 5,094,037 A | * | 3/1992 | Hakomori et al. .......... 451/11 |
| 5,433,651 A | | 7/1995 | Lustig et al. ................ 451/6 |
| 5,609,511 A | * | 3/1997 | Moriyama et al. ........... 451/5 |
| 5,762,853 A | * | 6/1998 | Harris et al. .............. 264/254 |
| 5,838,447 A | | 11/1998 | Hiyama et al. ........... 356/381 |
| 5,893,796 A | | 4/1999 | Birang et al. ............. 451/526 |
| 5,934,974 A | * | 8/1999 | Tzeng ........................ 451/6 |
| 5,938,502 A | * | 8/1999 | Kubo ......................... 451/6 |
| 5,938,801 A | | 8/1999 | Robinson ................... 51/306 |
| 5,949,927 A | | 9/1999 | Tang ......................... 385/12 |
| 6,045,439 A | | 4/2000 | Birang et al. ............. 451/526 |
| 6,068,539 A | | 5/2000 | Bajaj et al. .................. 451/6 |
| 6,106,662 A | | 8/2000 | Bibby, Jr. et al. ......... 156/345 |
| 6,146,242 A | | 11/2000 | Treur et al. .................. 451/6 |
| 6,174,227 B1 | | 1/2001 | Ishikawa .................. 451/533 |
| 6,190,234 B1 | | 2/2001 | Swedek et al. .............. 451/6 |
| 6,227,956 B1 | * | 5/2001 | Halley ..................... 451/288 |
| 6,559,765 B2 | * | 5/2003 | Tsuzuki et al. ........... 340/506 |

FOREIGN PATENT DOCUMENTS

JP          3-234467        10/1991

* cited by examiner

Primary Examiner—Angela Ortiz
(74) Attorney, Agent, or Firm—K. David Crockett; Crockett & Crockett (57) ABSTRACT

An optical sensor that includes a light source and a detector is located within a cavity in a polishing pad so as to face the surface that is being polished. Light from the light source is reflected from the surface being polished and the detector detects the reflected light. The electrical signal produced by the detector is conducted to a hub located at the central aperture of the polishing pad. The disposable polishing pad is removably connected, both mechanically and electrically to the hub. The hub contains electronic circuitry that is concerned with supplying power to the optical sensor and with transmitting the electrical signal to a non-rotating station. Several techniques are described for accomplishing these tasks. The system permits continuous monitoring of an optical characteristic of a surface that is being polished, even while the polishing machine is in operation, and permits the end point of the polishing process to be determined.

7 Claims, 11 Drawing Sheets

METHOD FOR MAKING A POLISHING PAD WITH BUILT-IN OPTICAL SENSOR

FIELD OF THE INVENTIONS

The present invention is in the field of semiconductor wafer processing, and more specifically relates to a disposable polishing pad for use in chemical mechanical polishing. The polishing pad contains an optical sensor for monitoring the condition of the surface being polished while the polishing operation is taking place, thus permitting determination of the endpoint of the process.

BACKGROUND OF THE INVENTIONS

In U.S. Pat. No. 5,893,796 issued Apr. 13, 1999 and in continuation U.S. Pat. No. 6,045,439 issued Apr. 4, 2000, Birang et al. show a number of designs for a window installed in a polishing pad. The wafer to be polished is on top of the polishing pad, and the polishing pad rests upon a rigid platen so that the polishing occurs on the lower surface of the wafer. That surface is monitored during the polishing process by an interferometer that is located below the rigid platen. The interferometer directs a laser beam upward, and in order for it to reach the lower surface of the wafer, it must pass through an aperture in the platen and then continue upward through the polishing pad. To prevent the accumulation of slurry above the aperture in the platen, a window is provided in the polishing pad. Regardless of how the window is formed, it is clear that the interferometer sensor is always located below the platen and is never located in the polishing pad.

In another optical end-point sensing system, described in U.S. Pat. No. 5,081,796 issued Jan. 21, 1992 to Schultz there is described a method in which, after partial polishing, the wafer is moved to a position at which part of the wafer overhangs the edge of the platen. The wear on this overhanging part is measured by interferometry to determine whether the polishing process should be continued.

In earlier attempts to mount the sensor in the polishing pad, an aperture was formed in the polishing pad and the optical sensor was bonded into position within the aperture by means of an adhesive. However, subsequent tests revealed that the use of an adhesive could not be depended upon to prevent the polishing slurry, which may contain reactive chemicals, from entering the optical sensor and from penetrating through the polishing pad to the supporting table.

In conclusion, although several techniques are known in the art for monitoring the polished surface during the polishing process, none of these techniques is entirely satisfactory. Accordingly, the present inventor sets out to devise a monitoring system that would be economical and robust, taking advantage of recent advances in the miniaturization of certain components.

SUMMARY

The disposable polishing pad described below is composed of foamed urethane. It contains an optical sensor for monitoring, in situ, an optical characteristic of a wafer surface being polished. The real-time data derived from the optical sensor enables, among other things, the end-point of the process to be determined without disengaging the wafer for off-line testing. This greatly increases the efficiency of the polishing process.

The wafers to be polished are composite structures that include strata of different materials. Typically, the outermost stratum is polished away until its interface with an underlying stratum has been reached. At that point it is said that the end point of the polishing operation has been reached. The polishing pad and accompanying optics and electronics is able to detect transitions from an oxide layer to a silicon layer as well as transitions from a metal to an oxide, or other material.

The polishing pad described involves modifying a conventional polishing pad by embedding within it an optical sensor and other components. The unmodified polishing pads are widely available commercially, and the Model IC 1000 made by the Rodel Company of Newark, N.J., is a typical unmodified pad. Pads manufactured by the Thomas West Company may also be used.

The optical sensor senses an optical characteristic of the surface that is being polished. Typically, the optical characteristic of the surface is its reflectivity. However, other optical characteristics of the surface can also be sensed, including its polarization, its absorptivity, and its photoluminescence (if any). Techniques for sensing these various characteristics are well known in the optical arts, and typically they involve little more than adding a polarizer or a spectral filter to the optical system. For this reason, in the following discussion the more general term "optical characteristic" is used.

In addition to the optics the disposable pad provides an apparatus for supplying electrical power to the optical sensor in the polishing pad.

The disposable polishing pad also provides an apparatus for supplying electrical power for use in transmitting an electrical signal representing the optical characteristic from the rotating polishing pad to an adjacent non-rotating receiver. The pad is removably connectable to a non-disposable hub that contains power and signal processing circuitry.

An optical sensor that includes a light source and a detector is disposed within a blind hole in the polishing pad so as to face the surface that is being polished. Light from the light source is reflected from the surface being polished and the detector detects the reflected light. The detector produces an electrical signal related to the intensity of the light reflected back onto the detector.

The electrical signal produced by the detector is conducted radially inward from the location of the detector to the central aperture of the polishing pad by a thin conductor concealed between the layers of the polishing pad.

The disposable polishing pad is removably connected, both mechanically and electrically, to a hub that rotates with the polishing pad. The hub contains electronic circuitry that is concerned with supplying power to the optical sensor and with transmitting the electrical signal produced by the detector to non-rotating parts of the system. Because of the expense of these electronic circuits, the hub is not considered to be disposable. After the polishing pad has been worn out from use, it is disposed of, along with the optical sensor and the thin conductor.

Electrical power for operating the electronic circuits within the hub and for powering the light source of the optical sensor may be provided by several techniques. In one embodiment, the secondary winding of a transformer is included within the rotating hub and a primary winding is located on an adjacent non-rotating part of the polishing machine. In another embodiment, a solar cell or photovoltaic array is mounted on the rotating hub and is illuminated by a light source mounted on a non-rotating portion of the machine. In another embodiment, electrical power is derived from a battery located within the hub. In yet another embodiment, electrical conductors in the rotating polishing pad or in the rotating hub pass through the magnetic fields of permanent magnets mounted on adjacent non-rotating portions of the polishing machine, to constitute a magneto.

The electrical signal representing an optical characteristic of the surface being polished is transmitted from the rotating hub to an adjacent stationary portion of the polishing machine by any of several techniques. In one embodiment, the electrical signal to be transmitted is used to frequency modulate a light beam that is received by a detector located on adjacent non-rotating structure. In other embodiments, the signal is transmitted by a radio link or an acoustical link. In yet another embodiment, the signal is applied to the primary winding of a transformer on the rotating hub and received by a secondary winding of the transformer located on an adjacent non-rotating portion of the polishing machine. This transformer may be the same transformer used for coupling electrical power into the hub, or it can be a different transformer.

There must be a viable optical path between the top of the sensor and the lower side of the wafer. However, a void would not be acceptable, because it would quickly become filled with polishing slurry, thereby rendering it incapable of serving as an optical medium. In addition, a void would present a large mechanical discontinuity in the otherwise homogenous and uniformly resilient polishing pad. Further, the components of the optical sensor must not come into direct mechanical contact with the wafer that is being polished, to avoid scratching the surface of the wafer.

To overcome this problem, the optical sensor is embedded into the polishing pad using techniques described in detail below. These techniques have been successful in overcoming the disadvantages described above.

One technique to embed the optical sensor and other optical detection sub-assembly components, such as an electrical conductor ribbon, contact pad, and a snap ring assembly, is to fashion the polishing pad from a single mold. The pad components are placed inside the mold and then urethane is injected or poured into the mold. Once cured, the urethane forms a polishing pad with the various pad components embedded in the pad.

DETAILED DESCRIPTION OF THE INVENTIONS

Figure 1:
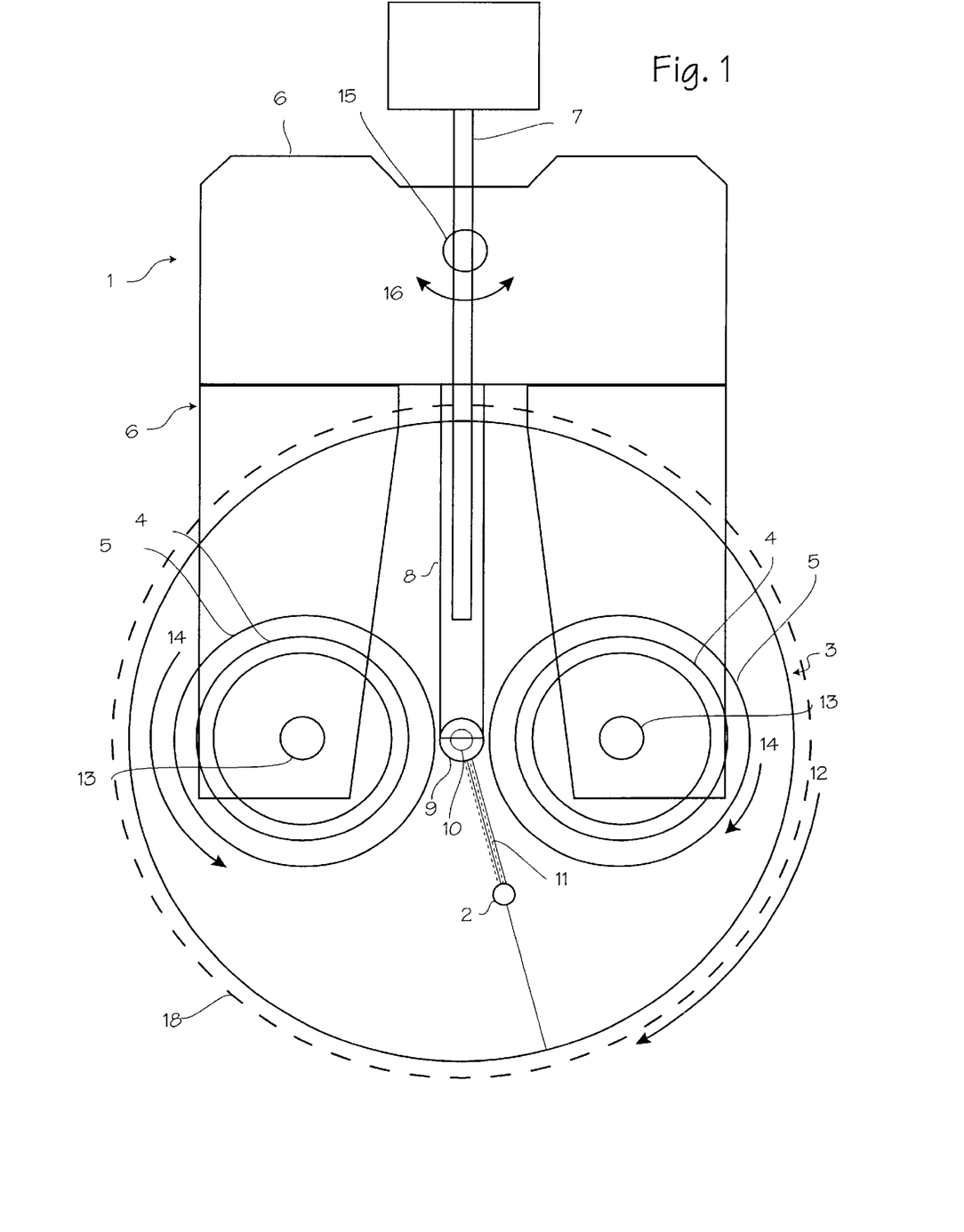
FIG. 1 shows a top view of a chemical mechanical planarization machine polishing wafers using a polishing pad embedded with optical sensors.

FIG. 1 is an overhead view of a chemical mechanical system 1 with the optical port 2 cut into the polishing pad 3. The wafer 4 (or other work piece requiring planarization or polishing) is held by the polishing head 5 and suspended over the polishing pad 3 from a translation arm 6. Other systems may use several polishing heads that hold several wafers, and separate translation arms on opposite sides (left and right) of the polishing pad.

The slurry used in the polishing process is injected onto the surface of the polishing pad through slurry injection tube 7. The suspension arm 8 connects to the non-rotating hub 9 that suspends over the electronic assembly hub 10. The electronics assembly hub 10 is removably attached to the polishing pad 3 by means of twist lock, detents, snap rings, screws, threaded segments, or any releasable mating mechanism. The hub 10 is attached to an electrical conducting assembly located within the pad where the hub attaches. The electrical conducting assembly can be either a single contact or a plurality of contacts attached to a thin, electrically conducting ribbon 11, also known as a flex circuit or ribbon cable. The ribbon 11 electrically connects an optical sensing mechanism, located within the optical port 2 and embedded in the pad 3, to the electronics in the electronics hub 10. The ribbon 11 may also comprise individual wires or a thin cable.

The window rotates with the polishing pad, which itself rotates on a process drive table, or platen 18, in the direction of arrow 12. The polishing heads rotate about their respective spindles 13 in the direction of arrows 14. The polishing heads themselves are translated back and forth over the surface of the polishing pad by the translating spindle 15, as indicated by arrow 16. Thus, the optical window 2 passes under the polishing heads while the polishing heads are both rotating and translating, swiping a complex path across the wafer surface on each rotation of the polishing pad/platen assembly.

The optical port 2 and the electrical conducting assembly (see FIG. 10) always remain on the same radial line 17 as the pad rotates. However, the radial line translates in a circular path as pad 3 rotates about the hub 9. Note that the conducting ribbon 11 lies along the radial line 17 and moves with it.

Figure 2:
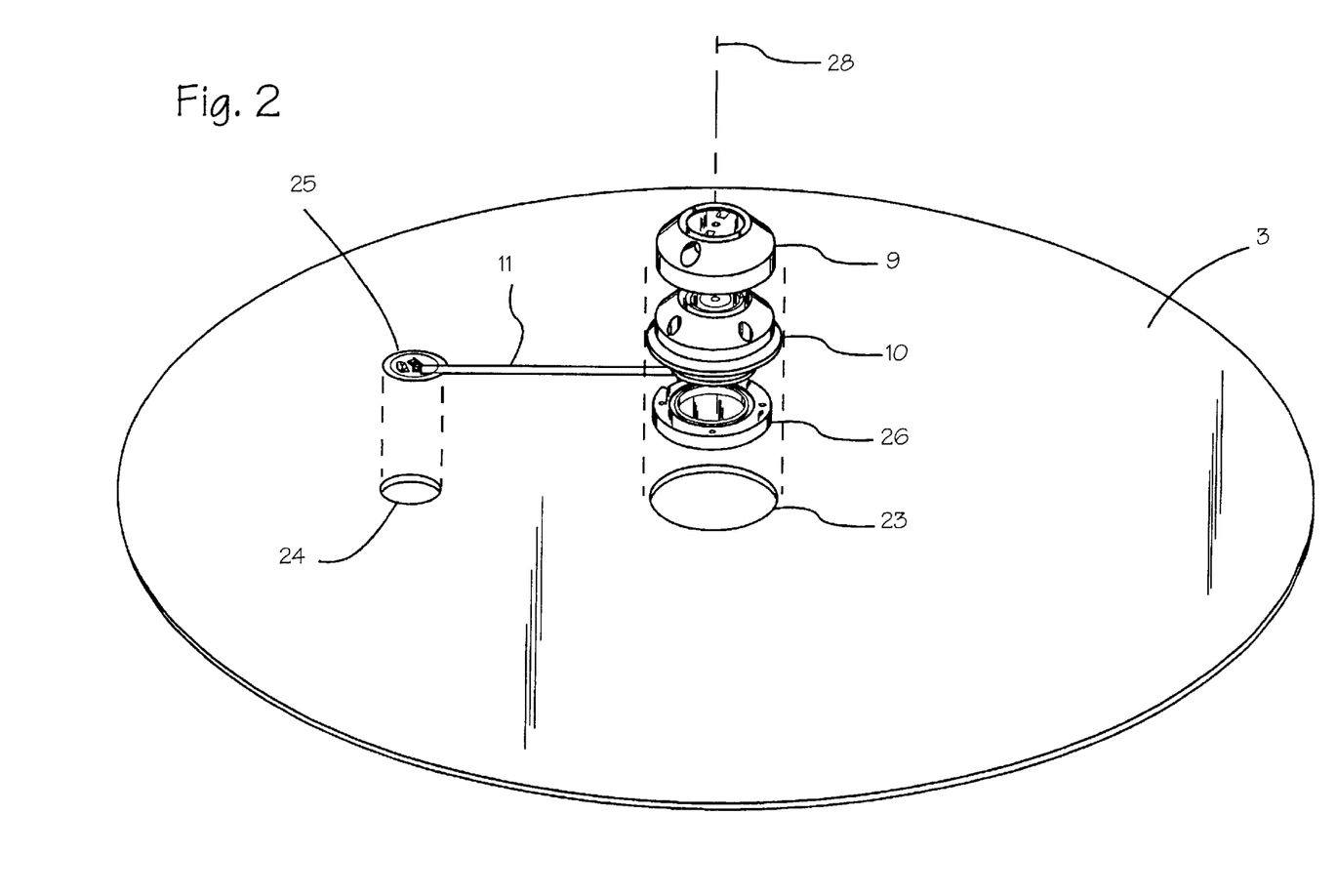
FIG. 2 is an exploded view in perspective showing the general arrangement of the elements of the hub and optical assembly as placed in a polishing pad.

As shown in FIG. 2, the polishing pad 3 has a circular shape and a central circular aperture 23. A blind hole 24 is formed in the polishing pad, and the hole opens upwardly so as to face the surface that is being polished. An optical sensor 25 is placed in the blind hole 24 and a conductor ribbon 11, which extends from the optical sensor 25 to the central aperture 23, is embedded within the polishing pad 3.

Figure 5:
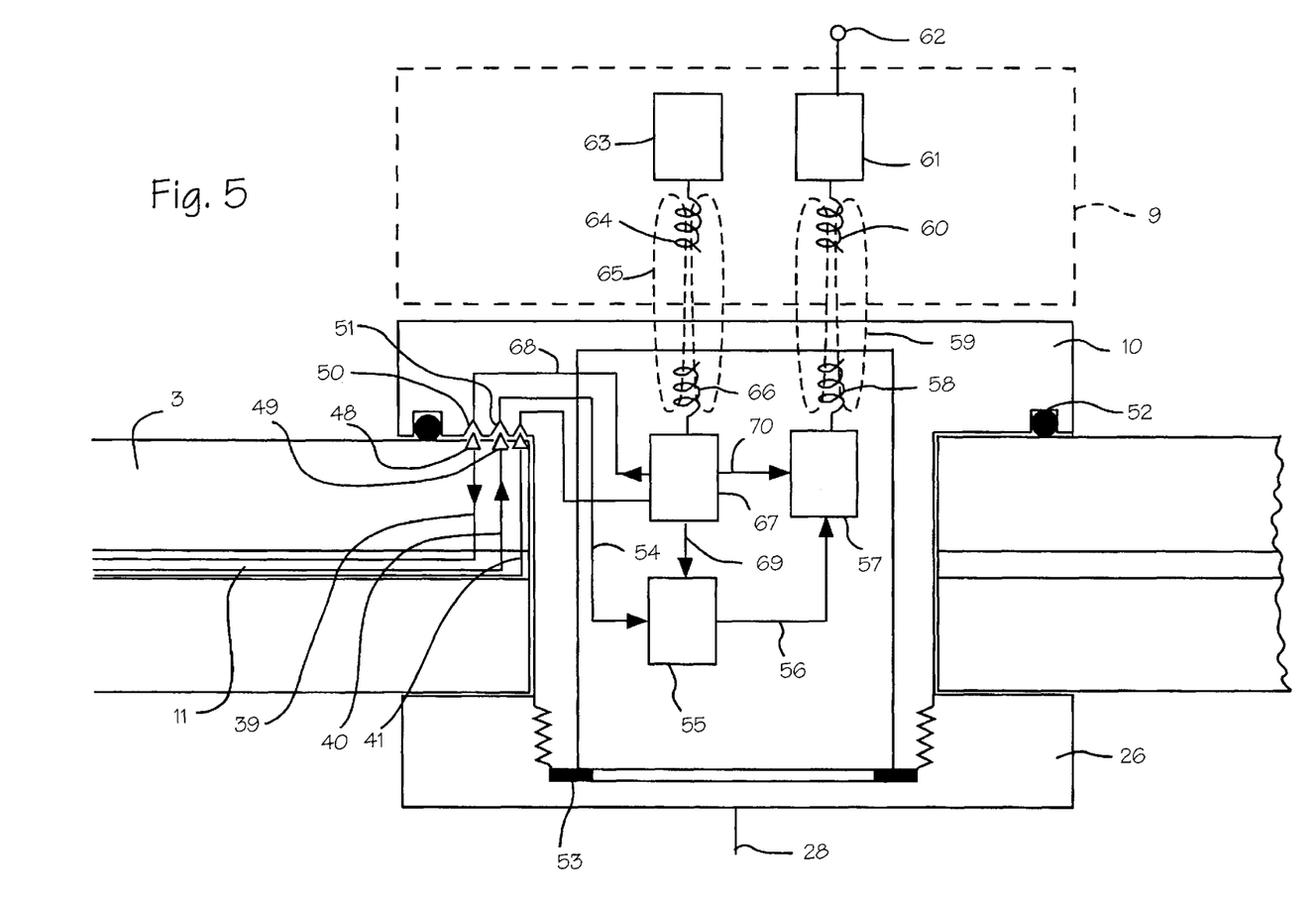
FIG. 5 illustrates an electronics hub using an inductive coupler.

When the polishing pad 3 is to be used, an electronics hub is inserted from above into the central aperture 23 and secured there by screwing a base 26, which lies below the polishing pad 3, onto a threaded portion of the hub 10. As seen in FIG. 5, the polishing pad 3 is thus clamped between portions of the hub and portions of the base 26. During the grinding process, the polishing pad 3, the hub 10 and the base 26 rotate together about a central vertical axis 28.

The non-rotating hub 9 of the polishing machine is located adjacent and above the hub 10. The non-rotating hub 9 is fixed during operation to the suspension arm 8.

Figure 3:
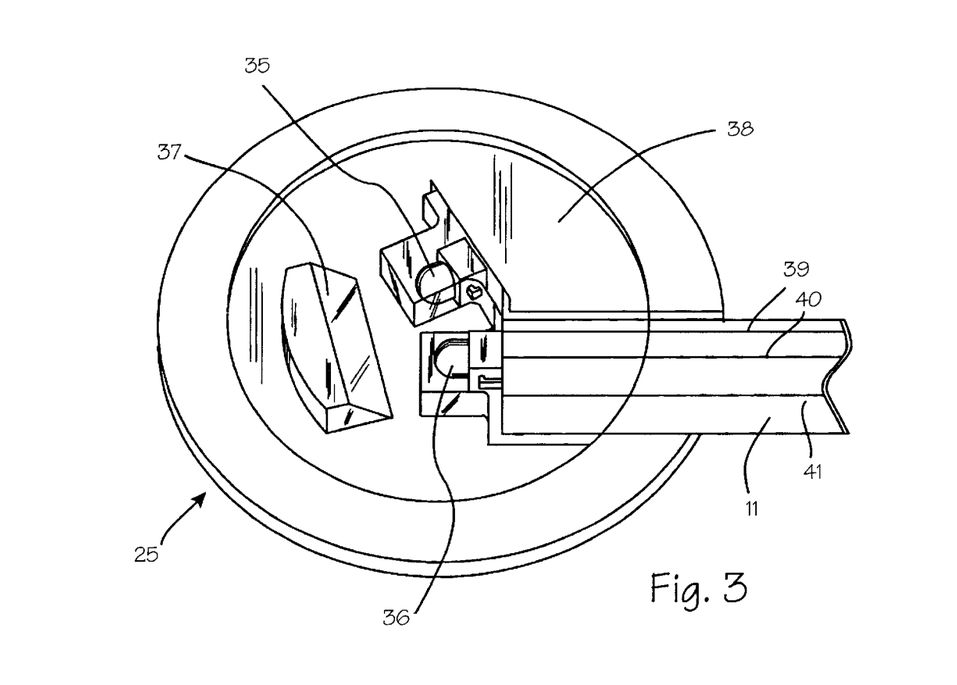
FIG. 3 is a front top perspective view of the optical sensor.
Figure 4:
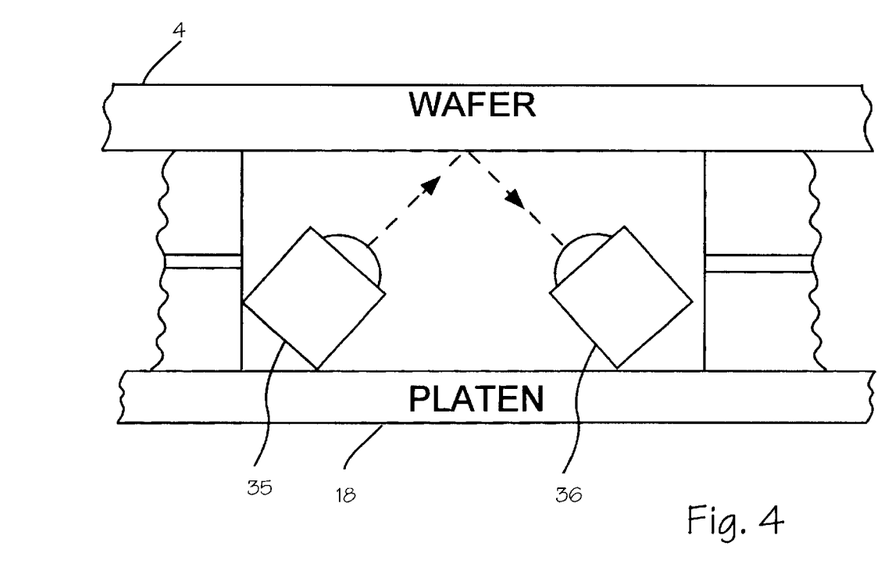
FIG. 4 is a side elevational diagram showing an optical sensor without a prism.

FIG. 3 shows the optical sensor 25 in greater detail. The optical sensor 25 includes a light source 35, a detector 36, a reflective surface 37 (which could be a prism, mirror, or other reflective optical component), and the conductor ribbon 11. The conductor ribbon 11 includes a number of generally parallel conductors laminated together for the purpose of supplying electrical power to the light source 35 and for conducting the electrical output signal of the detector 36 to the central aperture 23. Preferably, the light source 35 and the detector 36 are a matched pair. In general, the light source 35 is a light emitting diode and the detector 36 is a photodiode. The central axis of the beam of light emitted by the light source 35 is directed horizontally initially, but upon reaching the reflective surface 37 the light is redirected upward so as to strike and reflect from the surface that is being polished. The reflected light also is redirected by the reflective surface 37 so that the reflected light falls on the detector 36, which produces an electrical signal in relation to the intensity of the light falling on it. The arrangement shown in FIG. 3 was chosen to minimize the height of the sensor. The reflective surface 37 may be omitted and instead the arrangement shown in side view in FIG. 4 may be used.

The optical components and the end of the conductor ribbon 11 are encapsulated in the form of a thin disk 38 that is sized to fit snugly within the blind hole 24 of FIG. 2. Note that in the arrangements of FIGS. 3 and 4 baffles may be used to reduce the amount of non-reflective light reaching the detector 36. Included within the conductor ribbon 11 are three conductors: a power conductor 39, a signal conductor 40, and one or more return or ground conductors 41.

FIG. 5 illustrates an electronics hub using an inductive coupler. The power conductor 39 terminates adjacent the central aperture 23 of the polishing pad 3 at a power plug 46, and the signal conductor 40 likewise terminates at a signal plug 49. When the hub 10 is inserted into the central aperture 23, the power plug 46 makes electrical contact with the power jack 50, and the signal plug 49 makes electrical contact with the signal jack 51. An O-ring seal 52 prevents the liquids used in the polishing process from reaching the plugs and jacks. A ring seal 53 is provided in the base 26 to further insure that the electronic circuits within the hub remain uncontaminated.

An electrical signal produced by the detector and related to the optical characteristic is carried by the conductor 54 from the signal jack 51 to a signal processing circuit 55, that produces in response to the electrical signal a processed signal on the conductor 56 representing the optical characteristic. The processed signal on the conductor 56 is then applied to a transmitter 57.

The process by which the signal is passed from the rotating hub 10 to the non-rotating hub 9 is referred to as inductive coupling, or RF coupling. The overall assembly may be referred to as an inductive coupler or an RF coupler.

The transmitter 57 applies a time-varying electrical current to the primary winding 58 of a transformer that produces a varying magnetic field 59 representative of the processed signal. The magnetic field 59 extends upward through the top of the hub 10 and is intercepted by a secondary winding 60 of the transformer which is located on an adjacent non-rotating portion 9 of the polishing machine, or on some other non-rotating object. The varying magnetic field 59 induces a current in the secondary winding 60 that is applied to a receiver 61 that produces on the terminal 62 a signal representative of the optical characteristic. This signal is then available for use by external circuitry for such purposes as monitoring the progress of the polishing operation or determining whether the end point of the polishing process has been reached.

A similar technique may be used to transfer electrical power from the adjacent non-rotating portion 9 of the polishing machine to the rotating hub 10. A prime power source 63 on the non-rotating portion 9 applies an electrical current to the primary winding 64 of a transformer that produces a magnetic field 65 that extends downward through the top of the hub 10 and is intercepted by a secondary winding 66 in which the varying magnetic field induces an electrical current that is applied to a power receiver circuitry 67. The power receiver 67 applies electrical power on the conductor 68 to the power jack 50, from which it is conducted through the power plug 46 and the power conductor 46 to the light source. The power receiver 67 also supplies electrical power to the signal processing circuit 55 through the conductor 69, and to the transmitter 57 through the conductor 70. Thus, power for operation of the LED may also be provided by inductive coupling.

The winding 58 is the same winding as winding 66, and winding 60 is the same winding as winding 64. Alternatively, the windings may be different. The superimposed power and signal components are at different frequency ranges and are separated by filtering.

Figure 6:
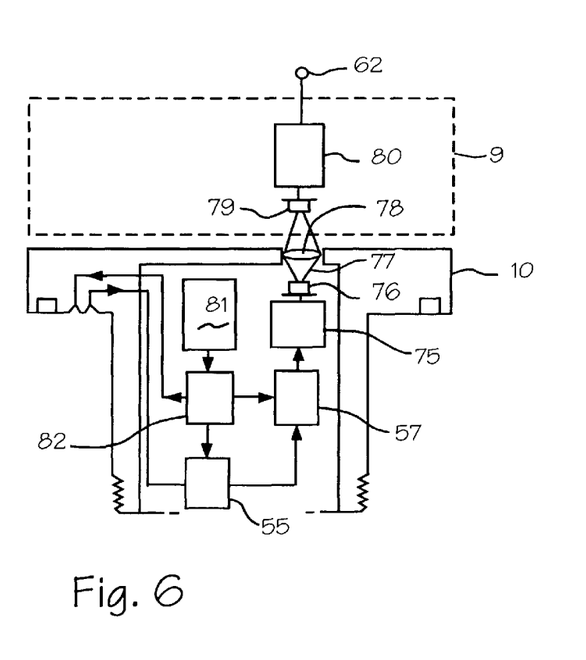
FIG. 6 is a diagram showing a cross sectional view of an hub using a light emitting means to transfer signals to a non-rotating hub.
Figure 7:
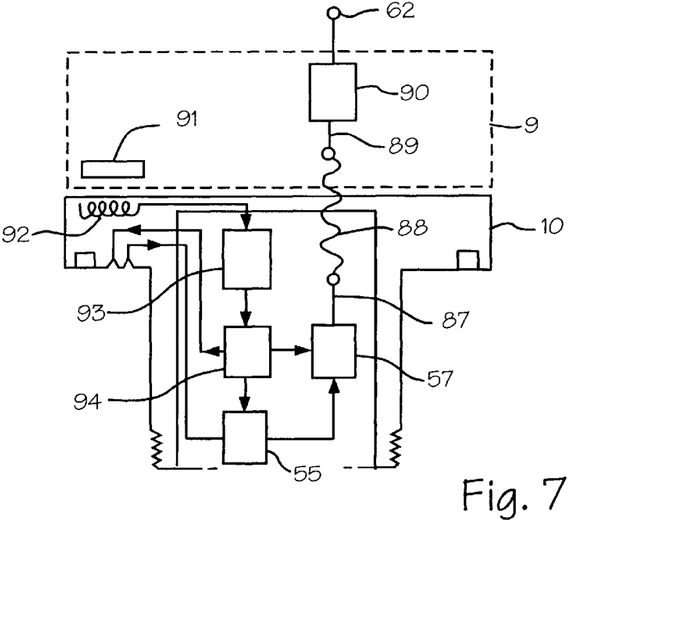
FIG. 7 is a diagram showing a cross sectional view of a hub utilizing radio emitting means to transfer signals to a non-rotating hub.
Figure 8:
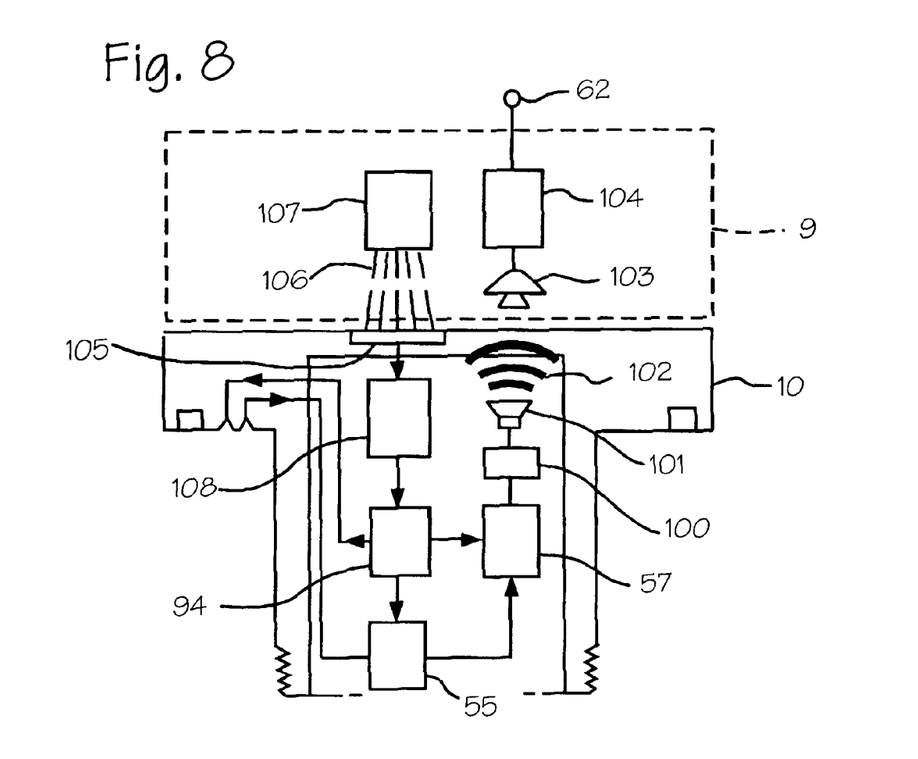
FIG. 8 is a diagram showing a cross sectional view of a hub utilizing sound waves to transfer signals to a non-rotating hub.

FIGS. 6 through 8 show other techniques used to transfer signals from the rotating hub 10 to a non-rotating hub 9 of the polishing machine, and to transfer electrical power from the non-rotating portion 9 into the rotating hub 10.

FIG. 6 shows the transmitter 57 further includes a modulator 75 that applies to a light emitting diode or laser diode 76 a frequency modulated current representative of the processed signal that represents the optical characteristic. The light-emitting diode 76 emits light waves 77 that are focused by a lens 78 onto a photodiode detector 79. The detector 79 converts the light waves 77 into an electrical signal that is demodulated in the receiver 80 to produce on the terminal 62 an electrical signal representative of the optical characteristic.

The prime source of electrical power is a battery 81 that supplies power to a power distribution circuit 82 that, in turn, distributes electrical power to the power jack 50, to the signal processing circuit 55, and to the transmitter circuit 57. In FIG. 7 the transmitter 57 is a radio transmitter having an antenna 87 that transmits radio waves 88 through the top of the hub 9. The radio waves 88 are intercepted by the antenna 89 and demodulated by the receiver 90 to produce an electrical signal on the terminal 62 that is representative of the optical characteristic.

Electrical power is generated by a magneto consisting of a permanent magnet 91 located in the non-rotating portion 29 and an inductor 92 in which the magnetic field of the permanent magnet 91 induces a current as the inductor 92 rotates past the permanent magnet 91. The induced current is rectified and filtered by the power circuit 93 and then distributed by a power distribution circuit 94.

In FIG. 8, the transmitter 57 further includes a power amplifier 100 that drives a loudspeaker 101 that produces sound waves 102. The sound waves 102 are picked up by a microphone 103 located in the non-rotating portion 29 of the polishing machine. The microphone 103 produces an electrical signal that is applied to the receiver 104 which, in turn, produces an electrical signal on the terminal 62 that is representative of the optical characteristic.

Electrical power is generated in the rotating hub 9 by a solar cell or solar panel 105 in response to light 106 applied to the solar panel 105 by a light source 107 located in the non-rotating portion 29. The electrical output of the solar panel 105 is converted to an appropriate voltage by the converter 108, if necessary, and applied to the power distribution circuit 94.

FIGS. 9 through 16 show the hub insertion assembly and the optical-electrical insertion assembly 25. They also disclose methods of sealing a snap ring (to releasably attach the electronics hub) and a optical-electrical assemblies into the polishing pad. The polishing pads 3 shown in these Figures are typical polishing pads available in the industry, such as the model IC 1000 produced by Rodel Co. The model comprises two 0.045 inch thick layers of foamed urethane bonded face to face by a 0.007 inch thick layer of adhesive. However, each has been modified to allow for a conducting ribbon 11, a snap ring 114, and an optical assembly 25 to be placed into the pad.

Figure 9:
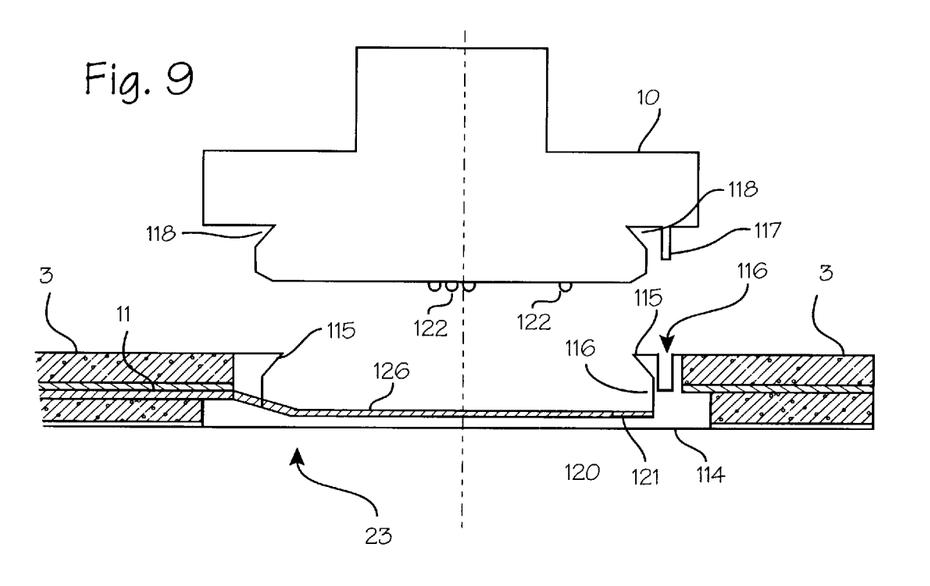
FIG. 9 shows a snap ring disposed in the polishing pad.

FIG. 9 shows a cross section of a molded insert, comprising a snap ring, 114 used to fix the electronics hub 10 into the center aperture of the polishing pad 3. The snap ring 114 is placed inside the center aperture 23 of the polishing pad 3. An inwardly extending flange 115, or collar, is cut out of the snap ring 114 so that the electronics hub 10 will snap securely into place. A guide pin hole 116 receives an electronics hub guide pin 117 to help assure proper alignment of the electronics hub 10. The snap ring is sealed inside of the polishing pad 3 by means of an adhesive or by a liquid urethane which subsequently dries and solidifies. The electronics hub 10 has a flange or ridge 118 disposed around its bottom section 119. This flange 118 is sized to provide a releasable fit with the molded insert snap ring 114.

The electrically conducting ribbon 11 conveys electrical signals and power between the optical assembly 25 and the electronics hub 10. The terminus of ribbon 11 is disposed on a contact pad 126 in the bottom of the hub-receiving aperture 120. The contact pad is provided with contacts for establishing electrical contact with matching contacts 122 disposed on the hub 10. The contacts 122 are preferably spring loaded or biased contacts (such as pogo pins). The contacts may be provided in redundant groups. As shown, three contacts are provided in the group visible in this view.

The snap ring assembly 114 is preferably isoplanar with the polishing pad 3 such that multiple pads may be easily stacked on top of each other.

Figure 10:
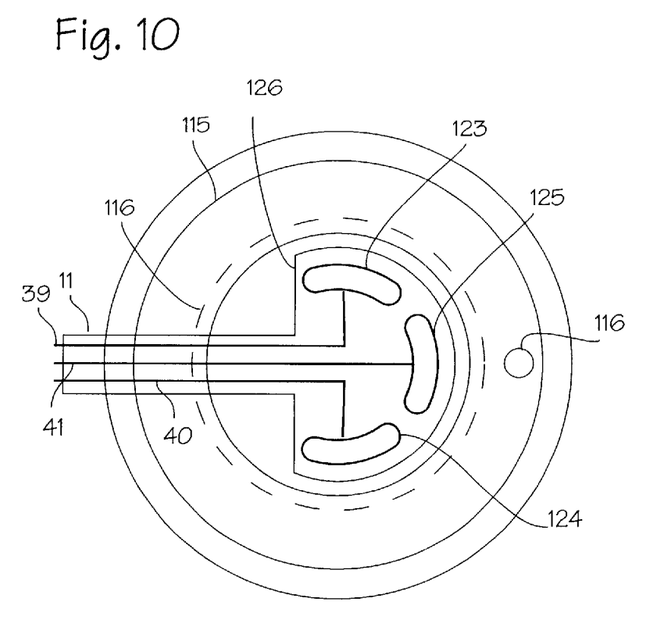
FIG. 10 is a top view of the snap ring, with a contact pad and conducting ribbon disposed on the bottom of the snap ring.

FIG. 10 shows a top view of the snap ring 114. The circular lip of the snap ring 115, the guide pin hole 116, and the electrically conducting ribbon 11 are the same as shown in FIG. 9. Also shown in this Figure are three electrical contacts disposed on the contact pad 126. Specifically, the three contacts are used for power conduction (contact 123), signal conduction (contact 124), and common ground (contact 125), all of which lie on the contact pad 126. The contact pad 126 is disposed on the bottom inside surface of the snap ring assembly.

The electronics hub will snap into place inside the lip 115 of the snap ring 114. Proper alignment of the contacts of the hub with the contacts of the contact pad 126 is assured by the guide pin 116. Thus, the contacts of the hub establish electrical contact with contacts 123, 124, and 125 of the contact pad 126 when the hub is secured in the snap ring.

Figure 11:
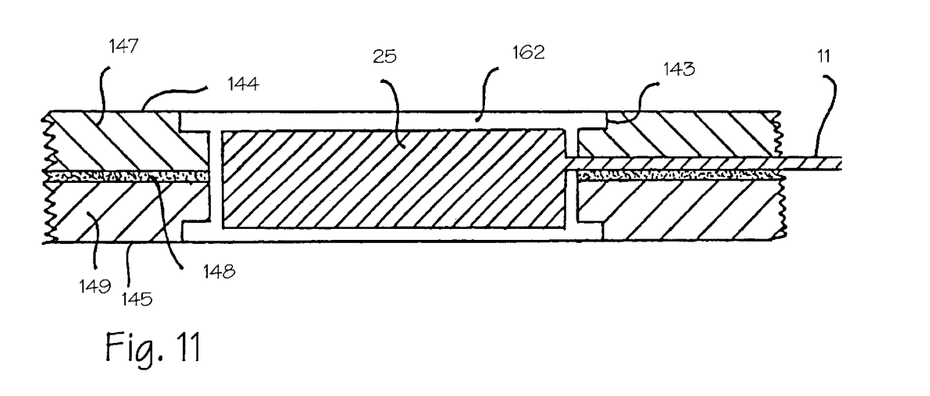
FIG. 11 shows a medial cross section of the optical sensor embedded into the polishing pad.
Figure 12:
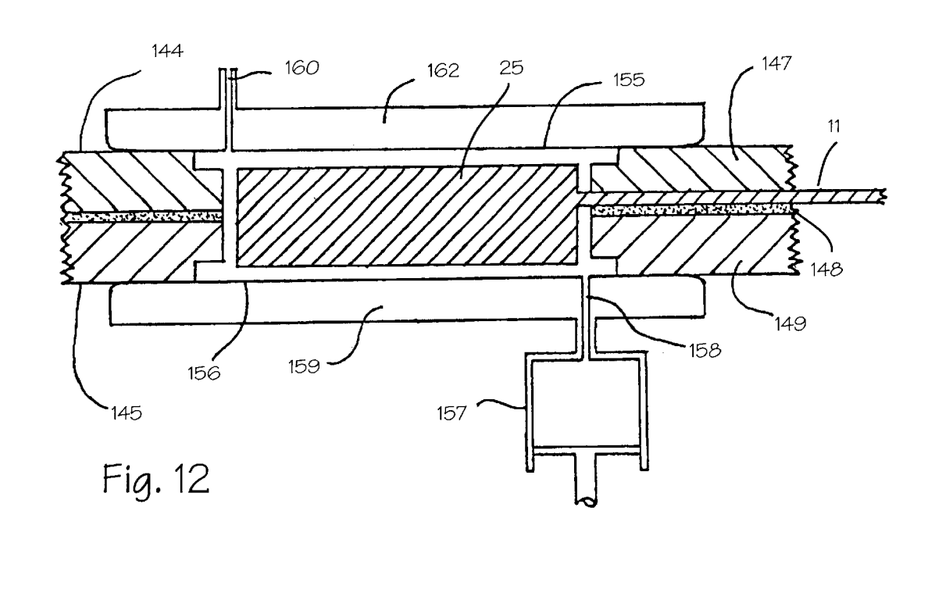
FIG. 12 shows a medial cross section of the injection molding process used to embed the optical sensor shown in FIG. 13.

FIGS. 11 and 12 show cross sections of the optical sensor 25 and a method of securing the optical sensor 25 in the optical port 2 into the polishing pad 3. An aperture, or hole, 143 is produced in the polishing pad. The aperture 143 must be large enough to accommodate the optical sensor 25. The optical assembly 25 is placed into an optical assembly puck so that it may be easily disposed into the aperture. Portions of the aperture adjacent to the upper surface 144 and lower surface 145 of the polishing pad 3 extend a short distance radially outwardly from the aperture. This creates a spool-shaped void with the boundaries of the pad.

A channel is produced in the underside of the upper layer 147 to accommodate the conducting ribbon 11 used to convey electrical power and signals from the electronics hub 10 to the optical sensor 25. The conducting ribbon 11 may intrude into the space generally occupied by the layer of adhesive 148, which secures the upper layer 147 of the polishing pad to the lower layer 149 of the polishing pad. Alternatively the conducting ribbon 11 may lie above or beneath the adhesive layer 148.

After the aperture 143 has been formed in the polishing pad 3, the optical sensor 25 and its conductor ribbon 11 are inserted into their respective places, where they are supported and held in place by spacers composed of urethane or by portions of the upper layer 147 and lower layer 149.

Thereafter, the assembly is placed into a fixture that includes flat, non-stick surfaces 155 and 156. The non-stick surfaces 155 and 156 are brought into contact with the upper pad surface 144 and lower pad surface 145 and pressed together.

Next, a liquid urethane is injected by syringe 157 through a passage 158 in the lower mold plate 159 and into the void immediately surrounding the optical sensor 25 until the injected urethane begins to emerge through the vent passage 160 of upper mold plate 161. During the injection, it is helpful to tilt the assembly slightly in the clockwise direction so that the liquid is injected at the lowest point of the void and the vent passage 160 is at the highest point. Tilting the assembly in this manner prevents air from becoming trapped in the void.

The injected urethane 162 directly above the optical sensor 25 serves as a window through which the optical sensor 25 can view the underside of the wafer , which is placed on top of the upper layer 147. The liquid urethane is a type of urethane that is optically transparent when it has cured. Because it is chemically similar to the urethane of the polishing pad 3, it forms a durable, liquid-proof bond with the material of the polishing pad 3.

Figure 13:
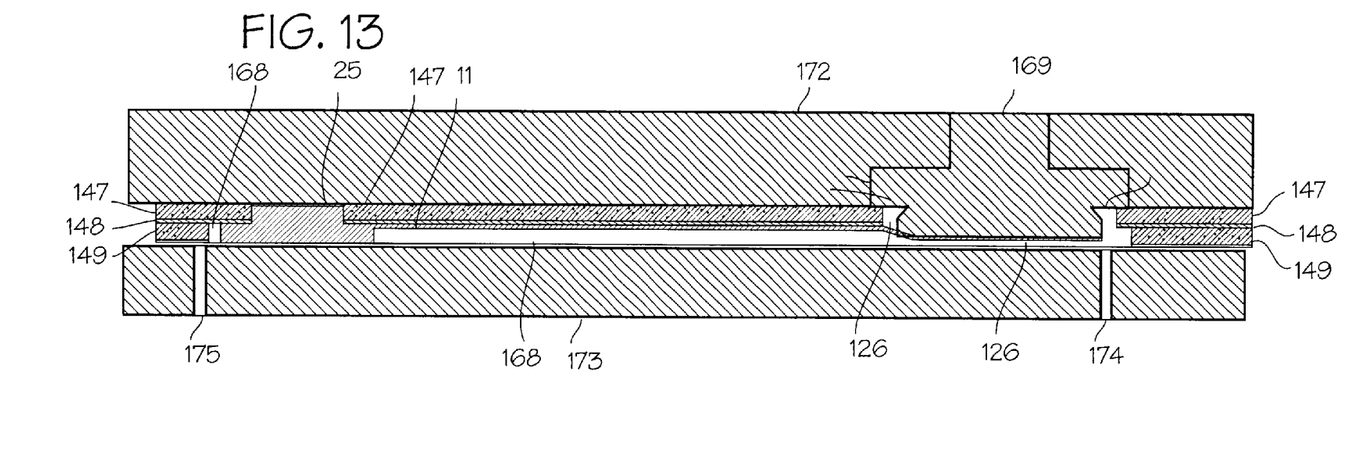
FIG. 13 shows a medial cross section of the optical sensor and hub assembly embedded in a single injection molded pad.
Figure 14:
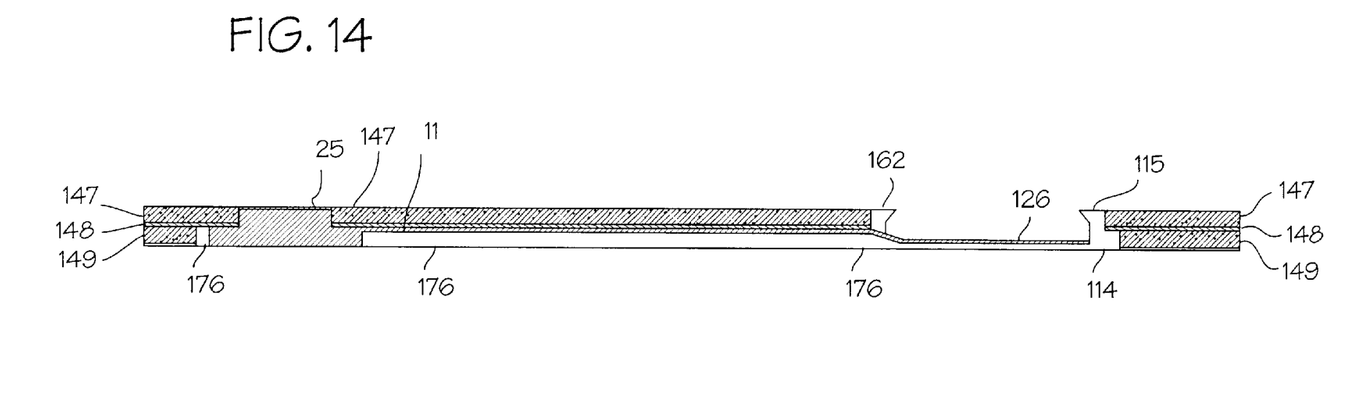
FIG. 14 shows a medial cross section of the injection molding process used to embed both the optical sensor and the hub assembly.

The snap-ring assembly can be inserted into the pad, as shown in FIG. 9, or formed or integrally with the pad with injection molding processes. As shown in FIGS. 13 and 14, the polishing pad 3, including the upper pad layer 147, lower pad layer 149 and adhesive layer 148, has been punched and cut to provide voids 168 for the optical sensor, ribbon cable and the electrode pad. The ribbon cable 11, contact pad, and optical sensor 25 are placed in the corresponding voids in the pad, and a snap ring hub mold is inserted into the hub aperture. The electrode pad may be glued with a weak pressure sensitive adhesive (sticky glue) to the snap ring mold 169.

As shown in FIG. 13, an upper mold base 172 and a lower mold base 173 are pressed against the polishing pad's upper layer 147 and lower 149 layer, respectively. Urethane or other injectable plastic is then injected through the injection port 174, and the urethane fills the voids. When the void between the plates is filled, the liquid urethane 162 will exit through the exit vent 175, signaling that the injection process is complete. As shown in FIG. 14, the injected urethane 176 forms the snap ring assembly and fills the ribbon cable channel and the optical sensor assembly aperture. The injected urethane seals and connects the entire length of void between the snap ring 114 and the optics insert 25, and it locks the ribbon cable and the sensor assembly into place within the pad.

This process can be accomplished using a snap ring insert as shown in FIGS. 9 and 10 by sizing the hub aperture in the pad slightly larger than the snap ring insert, and using the injected urethane to fix the snap ring insert to the pad.

Figure 15:
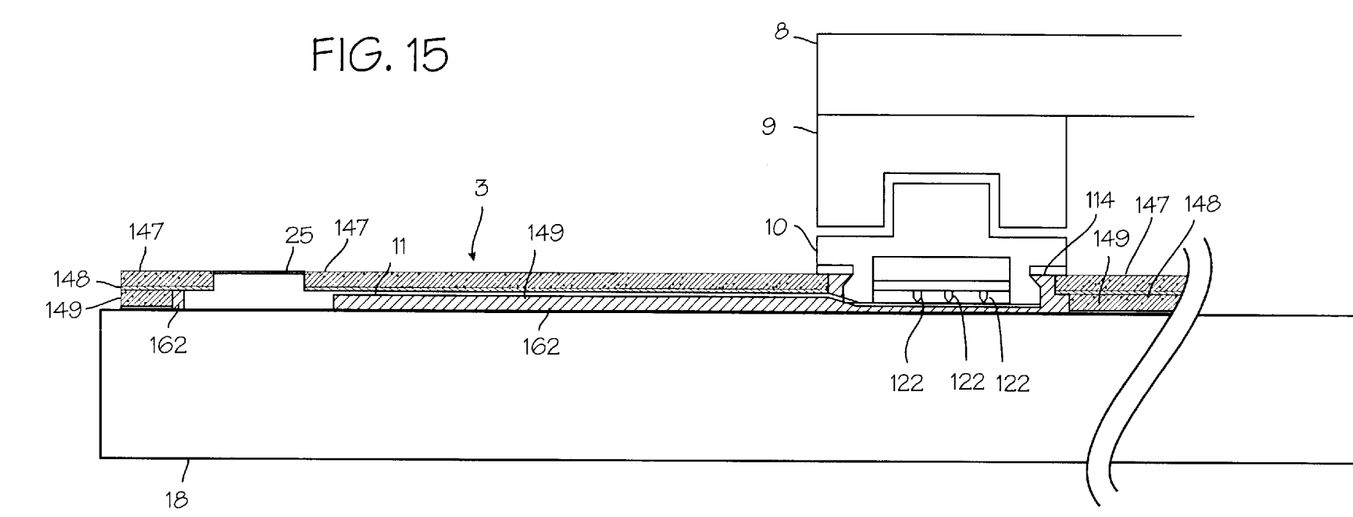
FIG. 15 shows the polishing pad installed in a CMP system.

FIG. 15 shows a detailed view of the overall polishing pad 3 installed in a CMP system, using the pad design shown in FIGS. 13 and 14. The pad comprises the upper pad layer 147, 18 lower pad layer 149, adhesive layer 148, injected urethane 176, electrically conductive ribbon 11, optical sensor 25, described in the previous Figures. The pad is placed on the platen 18. The electronics hub 10 is inserted in to the snap ring, so that the pogo pin electrical contacts 137 are in contact with the electrodes of the electrode pad. The non-rotating receiving hub 9 is suspended from the suspension arm 8 over the rotating electronics hub 10. The electronics in the rotating electronics hub may be the electronics shown in FIGS. 5 through 8, inside the box numbered as item 10 in those drawings, and the non-rotating receiving hub 9 will house the corresponding electronics in the boxes marked as items 9. After extended use, the pad will be exhausted and may be removed and discarded. A new pad may be placed on the platen, and the rotating hub may be inserted into the snap ring of the new pad.

Figure 16:
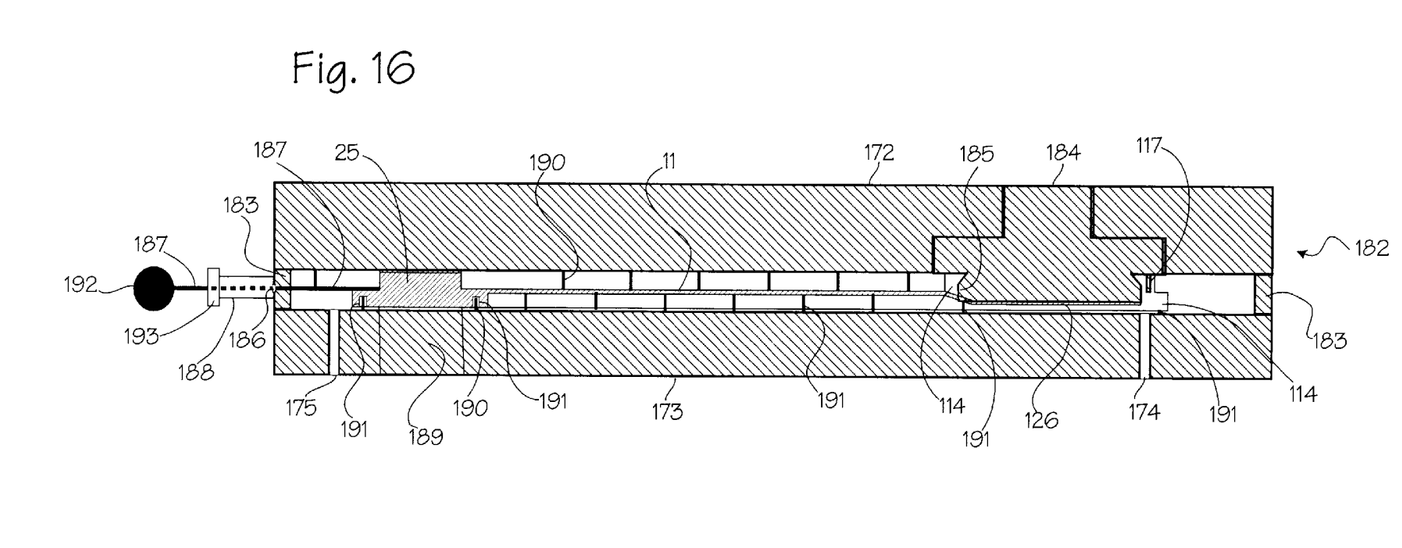
FIG. 16 illustrates another method for manufacturing a polishing pad with an embedded optical endpoint detection system.

FIG. 16 illustrates another method for manufacturing a polishing pad with an embedded optical endpoint detection system. In this method, the pad is formed over the embedded electronics, optical assembly, and hub, which are placed in a mold in which the pad is formed. FIG. 16 shows a cross section of a mold 182 used to fashion polishing pads having an optical endpoint detection system. An upper mold base 172, a lower mold base 173, and a mold wall 183 are provided to serve as a mold 182 for the polishing pad. The mold bases, 172 and 173, and mold wall 183 are shaped such that when a suitable pad material is poured or injected into the mold 182, the cured pad material will form a polishing pad having the desired shape (CMP pads are flat, round pads, but pads for other applications might be shaped differently). Suitable pad materials include all materials currently used to make polishing pads, such as urethane, polyurethane, nylon, polymeric matrix material, thermoplastic resins, and other injectable liquid plastics, polymers, and elastomers having a resilient solid form when cured.

A snap ring holder 184 may be disposed in the center of the upper mold base 172. The snap ring holder may be provided with a guide pin 117 and also may be provided with a flange 185 or ridge disposed around the bottom section of the snap ring holder 184. The snap ring holder fits securely into the snap ring assembly 114, which is provided separately and set into the mold 182 before the pad material is injected. (Note that the contact pad 126 may be disposed on the snap ring assembly). Alternatively, the upper mold base may be fashioned without a snap ring holder 184, though the upper mold base 172 should preferably keep the pad material from entering the snap ring assembly 114.

If the snap ring assembly is not provided, then the bottom surface of the snap ring holder 184 may be provided with a removably attached contact pad 126. The snap ring holder then acts as a mold and will cause a snap ring to form out of the pad material itself. The contact pad, which is connected to the conducting ribbon 11, remains when the finished pad is removed from the mold. If neither a snap ring assembly nor a snap ring assembly holder is provided, then the contact pad may be secured such that the contact pad is disposed in a particular location within the finished pad. When the pad is ready for use, the electronics assembly hub pins may be pushed through the pad material until the pins establish an electrical connection with the contact pad contacts.

The lower mold base 173 is provided with an injection port 174, through which pad material may be injected or poured, and may be provided with an exit vent 175, through which excess injected pad material may exit the mold 182. The injection port 174 and vent 175 may be provided in the upper mold base 172 instead. An injection port 174 and a vent 175 also may be placed on both mold bases or the injection port may be placed on one mold base and the vent placed on the other mold base. In addition, multiple injection ports or multiple vents may be provided in either mold base, when necessary to accommodate different optical endpoint sub-assembly components.

The mold wall 183 may also be provided with one or more portals 186, through which a tensioning thread 187 or other optical endpoint sub-assembly components may be inserted. A portion of the tensioning thread is shown in phantom to indicate that it communicates through a hollow bolt 188.

Each component of the pad mold 182 may be fashioned integrally with the other mold components, 172, 173, and 183, or each mold component may be provided as separate elements. However, the mold 182 should be constructed to allow for easy removal of the final pad. Thus, for example, the upper mold base 172, snap ring holder 184, and the mold wall 183 can be fashioned as an integral unit (with the lower mold base 173 removably attached to the mold wall 183). On the other hand, each of the mold bases and the mold wall may be removably attached to each other.

Once the mold is ready to be assembled the optical sensor 25, snap ring assembly 114, contact pad 126, and conducting ribbon 11 are provided inside the assembled pad mold 182. Together the optical sensor, snap ring assembly, contact pad, conducting ribbon, and any other components disposed within the mold comprise the optical endpoint sub-assembly. The optical endpoint sub-assembly may be secured inside the mold 182 during the injection process by a variety of methods. For example, the snap ring assembly may be held in place by the snap ring assembly holder and the optical sensor may be held in place by gluing the optical sensor to the inner surface of the upper mold base 172, with the conducting ribbon disposed between the optical sensor and the snap ring assembly. The optical sensor 25 may also be held in place by an optical sensor holder 189 (which may be a large post) disposed in the lower mold base 173. The optical sensor holder 189 may leave a blind hole in the polishing pad, though the blind hole may be filled with pad material after the finished pad is removed from the mold. The optical sensor may also be held in place by sizing the optical sensor 25 to have a thickness equal to the distance between the upper and lower mold bases, and an additional glue may be used to further secure the optical sensor.

Another method of securing the optical endpoint subassembly during the injection process is to provide the inner surface of the lower mold base 173 with a plurality of posts 190 pins, or pegs. The posts, which may be either integrally part of the mold base 173 or removably attached to the mold base, provide physical support to the optical endpoint sub-assembly. The posts may have different lengths to accommodate the different components of the optical endpoint sub-assembly. The optical sensor 25 and snap ring assembly 114 may be provided with post channels 191 to accommodate the posts and further secure the optical sensor and snap ring assembly during the injection process. The posts and post channels are sized relative to each other so that the posts secure the optical endpoint sub-assembly components when the posts are disposed within the post channels. The posts 190 may also be disposed on the upper mold base 172, either alone or in conjunction with posts disposed on the lower mold base 173. In this case, the snap ring assembly 114 and optical sensor 25 may be provided with additional post channels to accommodate posts on the upper mold base 172.

Another method of securing the optical endpoint sub-assembly during the injection process is to attach a tensioning thread 187 to either the ribbon 11 or to the optical sensor 25. The tensioning thread 187 provides the tension needed to support the optical endpoint sub-assembly when pad material is injected into the mold 182. (The tensioning thread 187 may be also used in conjunction with the posts 190 to provide additional support to the optical endpoint sub-assembly). The tensioning thread 187 is disposed through the mold wall portal 186, through a hollow bolt 188 disposed over the mold wall portal, and secured to an anchoring object. For example, the tensioning thread may be secured by providing the tensioning thread with a stop 192 larger than the diameter of the hollow bolt. The tension in the thread may be adjusted by providing the bolt with a nut 193. As the nut is driven outwardly the nut applies a force to the stop, thus increasing the tension in the thread. Another method of securing the tensioning thread is to secure the thread to an anchor separate from the mold.

After the optical endpoint sub-assembly is secured, then pad material is injected or poured into the mold. Subsequently, the pad material is cured and the pad removed from the mold. If a tensioning thread is used to secure the components then the tensioning thread may be cut close to the pad and the pad edge smoothed, leaving part of the tensioning thread inside the pad. If posts were used to secure the components then the holes in the pad formed by the posts may be filled with additional pad material. In either case, the pad is then finished to remove excess pad material and to ensure pad quality. The finished pad is suitable for use as a polishing pad having an optical endpoint detection system.

Figure 17:
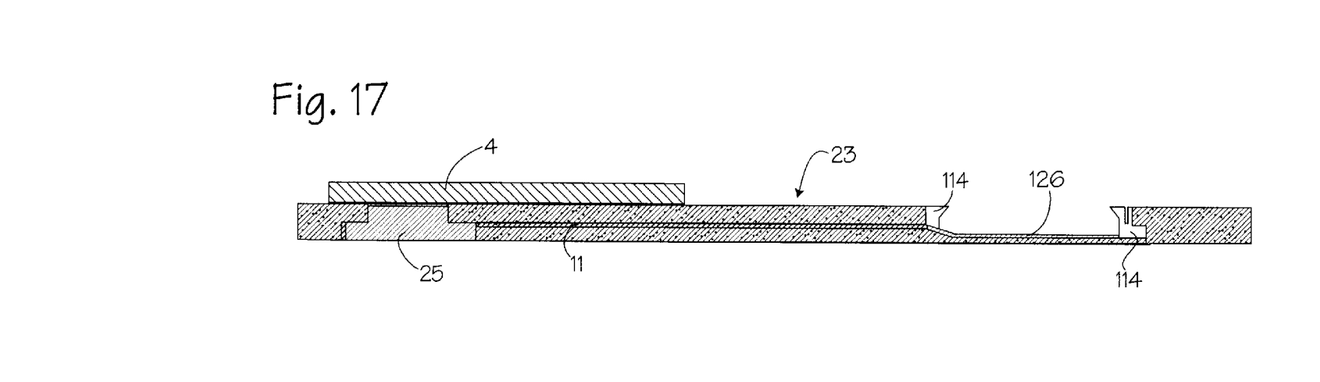
FIG. 17 shows a cross section of the polishing pad formed by using the mold of FIG. 16.

FIG. 17 shows a cross section of the polishing pad 23 formed by using the mold 182 of FIG. 16. The optical sensor assembly 25, ribbon cable 11, and snap ring assembly 114 are disposed inside the pad such that slurry will not be able to reach those optical endpoint sub-assembly components. In addition, the pad 23 is an integral whole and therefore may be produced quickly and cost efficiently. In use, the pad is operably disposed within a polishing machine, such as those shown in FIG. 1 and FIG. 15. An electronics hub is snapped into the snap ring assembly and electrically connected to the contact pad 126. A wafer 4 is disposed above the polishing pad such that the pad polishes the wafer in a complex pattern. Thus, the optical sensor 25 may pass multiple times over the wafer and may pass over multiple locations on the wafer surface. Accordingly, the optical endpoint detection system, which includes the optical endpoint sub-assembly and any associated electronics, is capable of sensing in real time when an appropriate amount of pad material has been removed from the entire wafer.

It should be noted that the various inventions may be employed in various combinations. For example, the releasable hub embodiments, described in connection with inductive couplers and other non-contacting couplers, can also be employed with slip rings and other contacting couplers. While urethane has been discussed as the material to be used as for injection and use as the injected sealant, other materials may be used, so long as they provide substantial adhesion and sealing between the several inserts and the pad. Additionally, while the pad construction has been discussed in relation to optical sensors, electrical sensors, heat sensors, impedance sensors and other sensors may be used instead, and the benefits of the molding and releasable hub still achieved. Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

I claim:

1. A method of manufacturing a polishing pad comprising the steps of:
   providing a mold comprising:
      a lower mold base having an injection port;
      an upper mold base disposed above the lower mold base;
      a mold wall disposed between the lower mold base and the upper mold base;
   providing within the mold an optical sensor, a contact pad, and an electrically conducting ribbon connecting the optical sensor and the contact pad;
   thereafter injecting urethane into the injection port; and
   curing the urethane.

2. A method of manufacturing a polishing pad comprising the steps of:
   providing a mold comprising:
      a lower mold base having an injection port;
      an upper mold base disposed above the lower mold base, said upper mold base having a snap ring holder; and
      a mold wall disposed between the lower mold base and the upper mold base;
   providing within the mold a snap ring disposed around the snap ring holder, an optical sensor disposed between the upper mold base and the lower mold base, and an electrically conducting ribbon that connects the snap ring to the optical sensor;
   thereafter injecting urethane into the injection port; and
   curing the urethane.

3. A method of manufacturing a polishing pad comprising the steps of:
   providing a mold comprising:
      a lower mold base having an injection port;
      an upper mold base disposed above the lower mold base, said upper mold base having a snap ring holder; and
      a mold wall having a portal, wherein the mold wall is disposed between the lower mold base and the upper mold base;

providing within the mold a snap ring, said snap ring disposed around the snap ring holder, an optical sensor, and an electrically conducting ribbon that connects the snap ring to the optical sensor;

providing a tensioning thread having a stop, said tensioning thread extending through a hollow bolt disposed on the mold wall, through the mold wall portal, and to the optical sensor;

thereafter injecting urethane into the injection port; and curing the urethane.

4. A method of manufacturing a polishing pad comprising the steps of:

providing a mold comprising:
- a lower mold base having an injection port;
- an upper mold base disposed above the lower mold base, said upper mold base having a snap ring holder, and wherein the upper mold base has a plurality of posts disposed on an inner surface of the upper mold base; and
- a mold wall disposed between the lower mold base and the upper mold base;

providing within the mold a snap ring disposed around the snap ring holder, an optical sensor disposed beneath the optical sensor mold, and an electrically conducting ribbon that connects the snap ring to the optical sensor, wherein the snap ring, optical sensor, and electrically conducting ribbon are disposed below the plurality of posts;

thereafter injecting urethane into the injection port; and curing the urethane.

5. The method of claim 4 comprising the further steps of injecting additional urethane into a plurality of holes left by the plurality of posts after the pad is cured and thereafter curing the additional urethane.

6. The method of claim 4 wherein at least one channel is disposed within the optical sensor and at least one channel is disposed within the snap ring assembly, wherein each of the at least one channels are sized and dimensioned to accommodate at least one of the plurality of posts.

7. The method of claim 6 comprising the further steps of injecting additional urethane into a plurality of holes left by the plurality of posts after the pad is cured and thereafter curing the additional urethane.

* * * * *